Patented May 5, 1931

1,804,379

UNITED STATES PATENT OFFICE

ISADORE SIDNEY MELLANOFF, OF PHILADELPHIA, PENNSYLVANIA, ASSIGNOR TO KEMIKAL, INC., A CORPORATION OF DELAWARE

PLASTIC FROM NATURAL RESIN, PHENOL, ALDEHYDE, AND ALKALI

No Drawing.   Application filed July 3, 1928.   Serial No. 290,267.

It is the purpose of my invention to produce plastics containing the condensation product of the reaction between phenol and aldehyde. I find that I can produce a resinous substance suitable for molding, coating material, a varnish ingredient, or other purposes for which plastics are commonly used by allowing a resinous material to enter into the reaction between phenol and aldehyde. By properly regulating or varying the quantity of the ingredients I can produce a condensation product which will resemble amber. The product may be transparent or it may be translucent or it may be opaque depending upon the treatment accorded the material during its formation and upon the proportions of the ingredients. I can produce a soft gelatinous mass or a soluble fusible mass of various colors or an insoluble infusible mass of various colors. The colors are not produced by the addition of coloring material but occur on the interaction of the ingredients employed in producing my condensation product. By varying the treatment of the material and the proportions of the ingredients the color may be varied in shade. The selection and proportion of ingredients and the treatment accorded may vary with the product desired.

In general in the heretofore known phenol-formaldehyde condensation reaction there has been a formation of two liquids which will separate or stratify on standing which may indicate that the condensation product is not soluble in the liquid. In my process, on the other hand, there is no such separation, as my condensation product seems to remain more or less evenly distributed throughout the entire solution.

The resinous matter which I prefer to employ in producing the condensation product includes rosin, stearin and various varnish gums such as are commonly employed in the manufacture of varnish including Congo gum, Manila gum, dammar gum, elemi gum, kauri gum, Pontianak and the like. As a preliminary step I sometimes find it convenient to crack the materials or heat them to a high temperature before incorporating them into my compound. The resinous matter may receive an initial treatment of an alkali before being reacted with the phenol and aldehyde. I sometimes find it convenient to dissolve the resinous matter in phenol before causing the phenol-aldehyde reaction.

By the term "alkali" I means to include an oxide or hydroxide of an alkali metal or an alkaline earth or a mixture thereof.

By the term "a phenol" I include phenol ($C_6H_5OH$) or its homologues as cresol, etc., as well as cresylic acid.

I use the term "aldehyde" to include formaldehyde, acetaldehyde or homologues of the aldehyde series or polymerized forms of formaldehyde or such compounds containing the mythelene group.

With each of my condensation products I may incorporate filling materials such as are well known in the art to produce a wide variety of compositions suitable for a great number of different uses.

Various resinous materials have been suggested for use in connection with condensation products but they have been employed merely as fillers. By my process the resinous material participates in the reaction and reacts with the other ingredients. It thus becomes an essential part of the composition.

A preliminary treatment of the resinous material by an alkali produces a resinous material which more readily combines with the phenol and aldehyde, and in so doing forms a new condensation product.

I employ the the term "plastic" to include a mass capable of being shaped or molded by the use of heat or by the use of heat and pressure. Before this final treatment the plastic material produced may be in a liquid state or a semi-solid state or a solid state or a comminuted state.

Without intending to limit my invention I will state several specific procedures as illustrative and to act as guides to those versed in the art.

I have found that if concentrated ammonium hydroxide is added to rosin there is formed a gelatinous mass. Two parts of the gelatinous mass may be added to twenty parts of phenol and twenty parts of formaldehyde. These may be heated together in a single container until solution takes place which will generally be about 70° C. I may then add two parts of an alkali such as sodium hydroxide and maintain the mass at a temperature of about 70° C. A condensation product soon results of a viscous or gelatinous character. Continued heating for about one half hour produces a soluble and fusible mass which on being further heated results in the formation of an insoluble and infusible mass. This material will generally resemble amber in transparency and color. I have found that if larger amounts of rosin are added the condensation product becomes less transparent gradually becoming translucent and finally opaque. By varying the amounts of rosin I can produce condensation products that are transparent, translucent or opaque as desired. If the heating and reaction are stopped when the condensation product is a gelatinous mass when hot but solid when cold I find that it may be dissolved to form a varnish the solvents employed being those usually used in varnish manufacture.

Similar products may be produced by the same process by mixing together two parts of rosin twenty parts of phenol twenty parts of aldehyde and two parts of alkali and dissolving the mixture by heating to about 70° and then proceeding as above indicated.

As an alternative, I may add two parts of rosin to twenty parts of phenol and heat until solution takes place. I may then add two parts of alkali and twenty parts of aldehyde and then proceed as above indicated.

Another procedure may consist of subjecting Congo gum or other varnish gum to the action of concentrated ammonium hydroxide to produce a gelatinous mass. Two parts of this gelatinous mass may be added to a solution of thirty parts of phenol thirty parts of aldehyde and two parts of alkali. The mixture may then be heated until a temperature of about 65 to 75° C. is obtained. If the mixture is held at that temperature there will be first produced a viscous mass which on further heating becomes soluble and fusible and as the heat continues the mass becomes insoluble and infusible. As with the product produced by the use of rosin this product will be transparent, but when larger proportions of the gum are employed the material becomes translucent or opaque depending upon the quantity of the gum used. The material produced by using the gum assumes a color ranging from pink to red, varying with the temperature employed and the quantity of varnish gum employed. Larger quantities of varnish gum will produce a deep shade of pink finally becoming red, smaller quantities of the gum introduced into the composition produce a lighter shade of pink. If the temperature is kept below 80° C. the material will be light pink in shade. If the reaction is produced at higher temperatures the materials will be darker in color, a material red in color being produced at about 100 or 110° C.

I may begin my operation by adding two parts of a varnish gum to thirty parts of phenol and heating the mixture to about 80° C. to bring about solution. To this I may add two parts of alkali and thirty parts of aldehyde maintaining a temperature of between 70 and 80° C. and continuing the process as indicated above. I may mix two parts of varnish gum with thirty parts of phenol, thirty parts of aldehyde and two parts of alkali and heat the mixture and proceed as above. I may get an improved effect by cracking or heating to a high temperature a varnish gum before beginning the process.

I find that a new and useful condensation product may be formed by first allowing phenol to exert its solvent action upon rubber and then adding alkali and aldehyde and proceeding as above.

Similarly a condensation product may be produced by mixing two parts of stearin thirty parts of phenol thirty parts of aldehyde and two parts of alkali. The mixture may then be heated and the process proceeded with as indicated above.

The condensation product formed by the use of rubber or by the use of stearin resembles in color the condensation product produced by the use of varnish gum and the color may vary from pink to red depending upon the amount of stearin or rubber employed and the temperatures employed. Similarly an opaque or translucent or transparent product may be produced by varying the quantities of stearin and rubber employed.

I may take a number of condensation products of different colors and in the viscous or semi-solid state and add them together so that they become heterogeneously mixed. This mixture may then be heated with or without the addition of pressure to form a fusible soluble or an infusible insoluble mass depending upon the heat or heat and pressure used. In this way I may produce condensation products having a varigated effect giving a mosaic appearance to the mass. Products of suitable colors may be employed and, of course, the appearance of the resulting product will vary depending upon the colors and tints of the materials entering into the mixture.

It should be understood that the precise conditions and quantities herein set forth are intended to be merely illustrative and not to limit the scope of my invention. The proportions of the ingredients may be considerably varied and the mode of application or compounding will depend on the results sought. I do not limit my invention to the above examples since modifications will suggest themselves to those skilled in the art without departing from my teaching.

I claim as my invention:

1. The process of producing a transparent, insoluble and infusible plastic substance comprising reacting two parts of rosin with twenty parts of aldehyde, twenty parts of phenol and two parts of alkali.

2. The process of producing a plastic substance comprising heating together to 70° C. two parts of rosin, twenty parts of aldehyde and twenty parts of phenol then adding two parts of alkali and maintaining the heat at 70° C.

3. A soluble, fusible plastic substance formed by reacting about two parts of rosin, about twenty parts of aldehyde, about twenty parts of phenol and about two parts of alkali at a temperature of about 70° C. which on further heating becomes insoluble and infusible.

4. A soluble, fusible transparent plastic substance formed by reacting about two parts of rosin, about twenty parts of aldehyde, about twenty parts of phenol and about two parts of alkali at a temperature of about 70° C. which on further heating becomes insoluble and infusible while remaining transparent.

5. The process of producing a plastic substance comprising treating natural resin with ammonium hydroxide and reacting about two parts of the resultant mass with about twenty parts of phenol, twenty parts of aldehyde and two parts of alkali.

6. The process of producing a plastic substance comprising treating rosin with ammonium hydroxide and reacting about two parts of the resultant mass with about twenty parts of phenol, twenty parts of aldehyde and two parts of alkali.

7. The process of producing a plastic substance comprising dissolving about two parts of natural resin in about twenty parts of phenol and reacting the solution with about two parts of alkali and about twenty parts of aldehyde.

8. The process of producing a plastic substance comprising dissolving about two parts of rosin in about twenty parts of phenol and reacting the solution with about two parts of alkali and about twenty parts of aldehyde.

ISADORE SIDNEY MELLANOFF.